US008832093B2

(12) United States Patent
Redstone et al.

(10) Patent No.: US 8,832,093 B2
(45) Date of Patent: Sep. 9, 2014

(54) DYNAMIC PLACE VISIBILITY IN GEO-SOCIAL NETWORKING SYSTEM

(75) Inventors: Joshua Redstone, Menlo Park, CA (US); Benjamin J. Gertzfield, Santa Clara, CA (US); Eyal M. Sharon, San Francisco, CA (US); Srinivasa P. Narayanan, San Francisco, CA (US); Daniel Jeng-Ping Hui, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 100 days.

(21) Appl. No.: 12/858,859

(22) Filed: Aug. 18, 2010

(65) Prior Publication Data

US 2012/0047147 A1 Feb. 23, 2012

(51) Int. Cl.
*G06F 7/00* (2006.01)
*G06F 17/30* (2006.01)

(52) U.S. Cl.
CPC .................................. *G06F 17/3087* (2013.01)
USPC .......................................... 707/724; 707/748

(58) Field of Classification Search
None
See application file for complete search history.

(56) References Cited

U.S. PATENT DOCUMENTS

| 8,150,844 B2 * | 4/2012 | Redstone et al. ............. 707/724 |
| 8,438,156 B2 * | 5/2013 | Redstone et al. ............. 707/724 |
| 2005/0227711 A1 | 10/2005 | Orwant |
| 2007/0233736 A1 * | 10/2007 | Xiong et al. ................ 707/104.1 |
| 2008/0070593 A1 | 3/2008 | Altman |
| 2008/0120396 A1 * | 5/2008 | Jayaram et al. .............. 709/218 |
| 2009/0047972 A1 | 2/2009 | Neeraj |
| 2010/0094878 A1 * | 4/2010 | Soroca et al. ................ 707/748 |
| 2011/0276565 A1 * | 11/2011 | Zheng et al. ................ 707/724 |
| 2014/0032325 A1 * | 1/2014 | Weiss et al. ................ 705/14.58 |
| 2014/0095337 A1 * | 4/2014 | Pigeon et al. ............... 705/26.4 |

FOREIGN PATENT DOCUMENTS

KR 10-2009-0000044 1/2009

OTHER PUBLICATIONS

Zheng et al., "GeoLife: A Collaborative Social Networking Service among User, Location and Trajectory", IEEE Data(base) Engineering Bulletin, Jun. 2010, IEEE.*
Symeonidis et al., "Geo-social Recommendations based on Incremental Tensor Reduction and Local Path Traversal", ACM LBSN '11, 2011, ACM.*
Gupta et al., "MobiSoC: a middleware for mobile social computing applications", Mobile Netw Appl, vol. 14, pp. 35-52, 2008, Springer Science + Business Media, LLC.*
Asadi et al., "Location-Based Search engines Tasks and Capabilities: A Comparative Study", Webology, vol. 4, No. 4, Article 48, 2007.*
Agichtein et al., "Finding High-Quality Content in Social Media", WSDM'08, pp. 183-193, 2008, ACM.*
Freyne et al., "Automated Murmurs: The Social Mobile Tourist Application", 2009 International Conference on Computational Science and Engineering, pp. 1021-1026, IEEE, 2009.*
International Search Report and Written Opinion for PCT/US2011/047378, Mar. 2, 2012.
Patent Examination Report No. 1 from IP Australia re Patent Application No. 2011292291, Feb. 28, 2014.

* cited by examiner

*Primary Examiner* — Michael Hicks
(74) *Attorney, Agent, or Firm* — Baker Botts L.L.P.

(57) ABSTRACT

In one embodiment, a user of a social networking system requests to search for a place near the user's current location. The social networking system generates a list of places near the user's current location, select a sub-set from the list of places based on visibility and activity of the user and the user's social contacts for each place in the list, and returns the sub-set to the user.

14 Claims, 7 Drawing Sheets

US 8,832,093 B2

DYNAMIC PLACE VISIBILITY IN GEO-SOCIAL NETWORKING SYSTEM

TECHNICAL FIELD

The present disclosure relates generally to a geo-social networking system and, more particularly, to dynamically adjusting visibility of places created in a geo-social networking system.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests.

SUMMARY

Particular embodiments relate to dynamically adjusting the visibility of places maintained in a geo-social networking system. In particular embodiments, a geo-social networking system may provide a list of suggested places to a user based on the user's geographic location to facilitate a check-in at a given place. The places may be user-created and system-created. Embodiments described below may modulate the visibility of one or more places based on a visibility setting that considers one or more of the activity of the user and the user's social contacts relative to the places maintained by the system. These and other features, aspects, and advantages of the disclosure are described in more detail below in the detailed description and in conjunction with the following figures.

DETAILED DESCRIPTION

Figure 1:
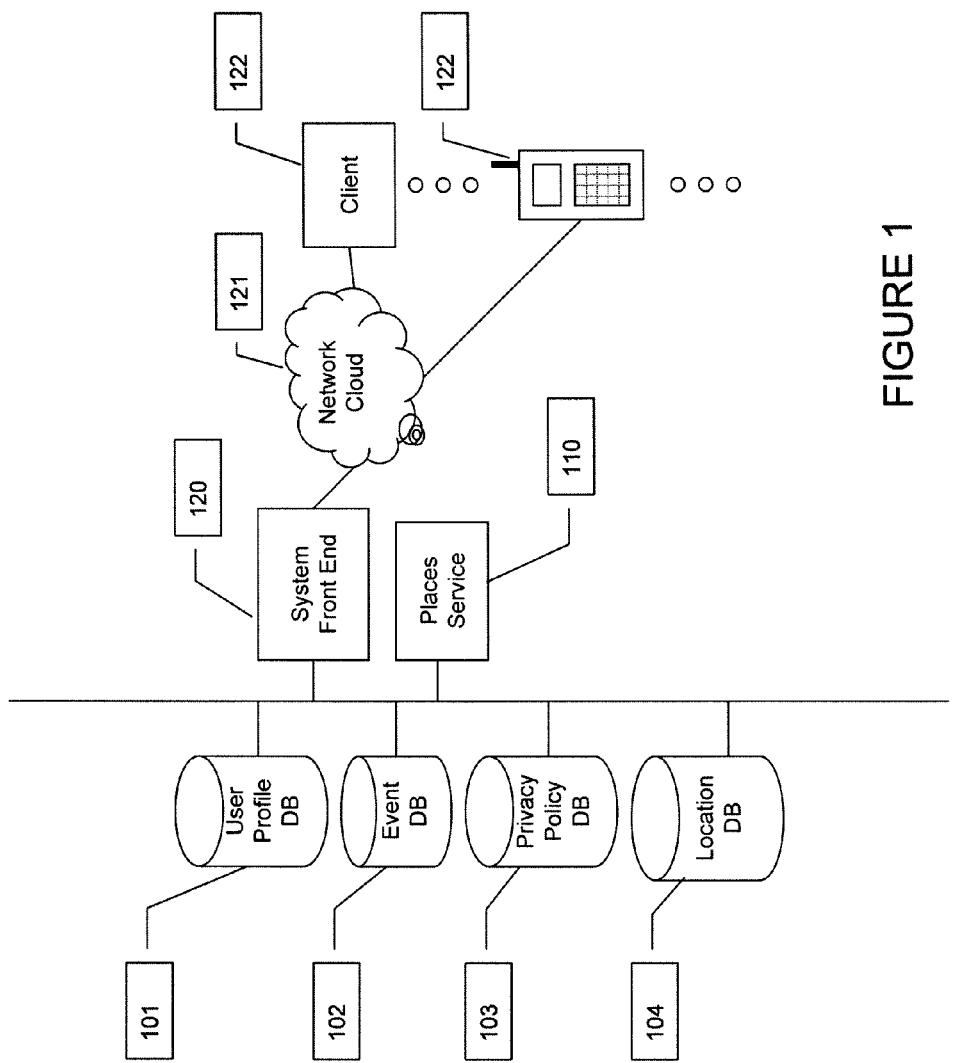
FIG. 1 illustrates an example of a social networking system with geographic services and capabilities.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user first registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph. U.S. patent application Ser. No. 12/763,171 filed Apr. 19, 2010, which is incorporated by reference herein, describes example social graph structures that may be used in various embodiments of the present invention.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763, 171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. As described in more detail below, check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. A entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. The user may also add, delete or update events that the user is associated with. For example, a user may update a social event associated with a time and date that the user is planning to attend, or make comments in his wall-posts about a past event he attended.

A user may or may not wish to share his information with other users or third-party applications, or a user may wish to share his information only with specific users or third-party applications. A user may control whether his information when checking in to a place is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

FIG. 1 illustrates an example social networking system with geographic services and capabilities, or a geo-social networking system. In particular embodiments, the social networking system may store user profile data in user profile database 101. In particular embodiments, the social networking system may store user event data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. In particular implementations, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store a geographic location and additional information for a plurality of places. For example, a place can be a local business, a point of interest (e.g., Union Square in San Francisco, Calif.), a college, a city, or a national park. A place may also be more particular to a user or group of users, such as a person's desk in an office building, a bedroom in a house, a traffic jam at a street corner, and the like. A geographic location of a place (e.g., a local coffee shop) can be an address, a set of geographic coordinates (latitude and longitude), or a reference to another place (e.g., "the coffee shop next to the train station" or within a radius or relative distance of another place). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In other embodiments, a place can be located within another place, forming a hierarchical relationship. For example, an airport is place that and has multiple terminals. These terminals may also be places that may or may not be associated with a larger, encompassing place—i.e., the airport. Location database 104 may also maintain additional information of a place, such as descriptions, thumbnail map parameters, business hours, contact information, web address, web links, photos, icons, badges, points, or user reviews or ratings of the place. A place object maintained by location database 104 may also include one or more tags associated with the place (e.g., coffee shop, cross streets, etc.) and one or more category identifiers that facilitate searches for places. In particular embodiments, location database 104 may store a user's location data.

Places in location database 104 may be system-created or defined and/or user-created. For example, location database 104 may store information relating to places created by users, such as in connection with a user's check-in activities. For example, a user can create a place (e.g., a new restaurant or coffee shop) and places service 110 stores the user created place in location database 104. As discussed above, social networking system may create one or more data structures relating to the place, such as a data object corresponding to the place and a data object corresponding to the user's check-in. In some implementations, social networking system may also create a "check-in" edge relationship between the node associated with the user in a social graph and a hub node associated with the place, if the social networking system maintains a hybrid social graph structure disclosed in U.S. patent application Ser. No. 12/763,171. A check-in data object may include a user identifier associated with the user, a place identifier (or a pointer to a place object or hub node), a time stamp and other meta information (such as geographic location coordinates of a mobile device of the user, comments of the user, etc.). In one implementation, places service 110 allows users to register the presence of other users (such as the user's friends) at a place in connection with a check-in. In one implementation, location database 104 maintains check-in data including, for a given check-in, the name of the place, a time stamp corresponding to the check-in, a user identifier associated with the check-in, a geographic location of the user provided in the check-in request and if applicable, a list of any friend(s) the user tagged in connection with a given check-in event. In some implementations, the number of users that have been tagged in connection with a check-in may also count as a separate check-in or some weighted amount. In some implementations, a "tagged user" check-in is only counted if the tagged user approves or acknowledges the check-in. In other implementations, more recent check-ins (whether in the total number or recent column) relative to a current search are weighted more highly than older check-ins.

Figure 1A:
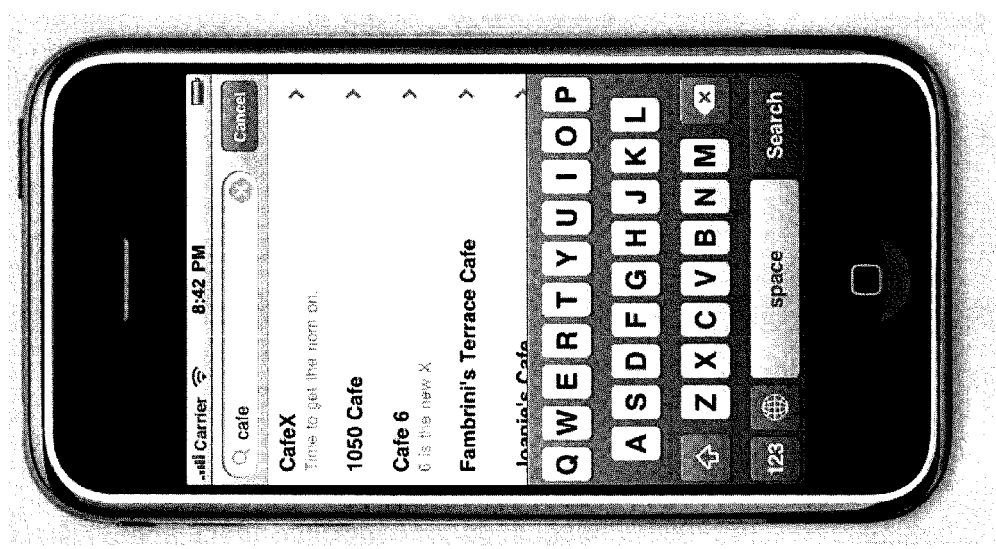
FIG. 1A illustrates an example graphical user interface for a type-ahead listing of suggested places on a mobile device.

In particular embodiments, places service 110 may be operably connected to databases 101, 102, 103, and 104. In connection with a check-in or a general search of nearby places, a user can receive a list of places near the user's current location by providing text (such as a text string that contains a full or partial name) describing a place (such as a name of the place, or a category or concept associated with a place) and/or a geographic location to place services 110. Places service 110 may search location database 104 and provide the user a list of places near the geographic location that match the text string (if provided). FIG. 1A illustrates an example graphical user interface for a type-ahead listing of suggested places on a mobile device. FIG. 1A shows a user interface where a user has entered the term "café." The client application that provides the user interface may periodically transmit the text string in a search request as the user enters additional text or changes existing text in the text entry field, possibly causing the places service 110 to transmit a renewed list of places to the client application. In other implementations, the client application may also retransmit the search request if the current location of the user changes by more than a threshold distance. However, as any other user of a social networking system can create one or more places, a place search of nearby places based on a distance from the user's current location and/or a text string match can yield a result that may or may not be relevant or appropriate to the user. For example, a place with offensive language in its name or in its description can be inappropriate even if the place is very close to the user's current location. In another example, place A may be more relevant to a user than place B, if none of the user's friends have checked in or searched for place B but many of the user's friends had checked in place A. In yet another example, one set of users may refer to a given place by a different name (such as a nickname for a place—e.g., Mickey D's) than a second set of users (e.g., McDonald's). In addition, some places created in the system may only have significance to a user or a particular set of users—such as the user's house, or office cube. It is thus desirable to control visibility of places to eliminate irrelevant and/or inappropriate place search results for a user or group of users to prevent one or more places from obscuring or interfering the list of places that a user may see during a search. Some implementations of the invention balances hiding of places that may be irrelevant or inappropriate to a search against the benefits of having places created by other users exposed to others so that check-ins are facilitated.

In particular embodiments, a social networking system may set up a place visibility policy to control visibility of places by creating a visibility state for each place maintained by the system. In particular embodiments, a visibility state of a place may be that the place is visible to all users in the social networking system. In particular embodiments, a visibility state of a place may be that the place is visible only to direct social contacts (friends) of one or more users associated with the place (e.g., a creator of the place, a user that has checked in to the place, or a user that has searched for the place). In particular embodiments, a visibility state of a place may be that the place is visible only to a creator of the place. In particular embodiments, another visibility state of a place may be that the place is hidden from all users in the social networking system.

In some search or check-in flows, visibility states of one or more places may be overridden or ignored. For example, social networking system may ignore the visibility state of a place, if it algorithmically determines that the user is searching for the place. In one implementation, social networking system may ignore the visibility state of a place, if the user has entered most or all of a name for the place in a text entry field, such as the text entry field of FIG. 1A. In addition, social networking system may ignore visibility states of a place when a user attempts to configure a new place to prevent a second user from unintentionally creating a duplicate place. In one implementation, social networking system may use a Levenshtein edit distance to search for places similar to the name a user provides when creating a new place.

Figures 2, 2A:
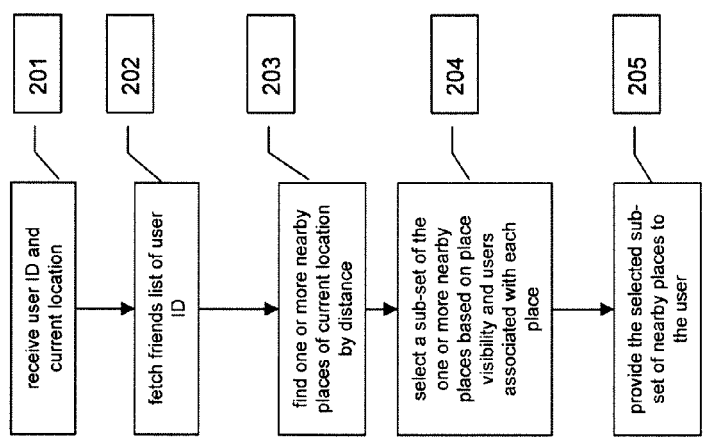
FIG. 2 illustrates an example method of creating a place list for a place search based on place visibility.
FIG. 2A illustrates an example method of selecting one or more places based on places place visibility and friends list.

FIG. 2 illustrates an example method of creating a place list for a place search based on place visibility states. In particular embodiments, places service 110 receives a request to check in to, or to search for, nearby places from a user. In particular embodiments, the user's request may include a user identifier of the user and a geographic location of the user (Step 201). In particular embodiments, a geographic location of the user's request, or the user's current location, may be identified by geographic coordinate system or other parameters. For example, a user can check in or search for nearby places by providing a user identifier and an address to a social networking system's web page. For example, a user can search for nearby places on a client application hosted on a GPS-equipped mobile device. The client application can access the mobile device's GPS functionality and provide a geographic location in a set of latitude and longitude numbers and a user identifier to places service 110. In particular embodiments, places service 110 may access user profile database 101 to create a list of the user's social contacts (e.g., the user's friends) in the social networking system (Step 202). In particular embodiments, places service 110 may access location database 104 to identify a set of one or more places near the user's current location. In particular embodiments, each place in the set of one or more places near the user's current location may be within a threshold distance from the user's current location (Step 203). For example, places service 110 can access location database 104 and compile a list of places that are within one mile from a user's current location.

In particular embodiments, the check-in or search request may additionally include a text string. In particular embodiments, places service 110 may access location database 104 to identify a set of one or more places wherein a place identifier (e.g., a name, a metadata value) of each place matches the text string partially or completely and where the place is within a threshold distance of the user's current location. For example, if a user wants to search for, or check in to, a nearby coffee shop, the user can type "coffe" in a web page or a client application. The places service 110 can return a list of nearby coffee shops, e.g., Starbucks Coffee, Peet's Coffee and Tea, Dunkin' Donuts, etc.

In particular embodiments, places service 110 may access location database 104 and select a sub-set from the set of one or more places near the user's current location based on place visibility states and, possibly, users associated with each place (Step 204). FIG. 2A illustrates an example method of selecting one or more places based on place visibility. In FIG. 2A, a user, having a user ID=50 at location (X, Y), transmits a request to search for nearby places in connection with an attempted check in to a nearby place in a social networking system. Places service 110 fetches a friends list (user ID=100, 200, and 300) from user profile database 101 and accesses location database 104 to identify a list of nearby places (place ID=1, 2, 3, 4, and 5), and for each place, a visibility state and one or more users associated with the place, if applicable. In one embodiment, the one or more users associated with a place may include one or more users who may have checked in to the place before, one or more users who may have searched for the place before, and a creator of the place. In some implementations, social networking system may also assess the relative effort that a user made to check in to a place. This level of effort can be used to weight the value of a check-in as used in determining a visibility state. For example, a check-in where a user initially creates a place (or begins the workflow to create the place before being presented with the place name when a visibility state is overridden) may be weighted more highly than a check-in associated with a user who selects a place from a list of places. In addition, check-ins to a place associated with a group of users that are friends or close contacts may be down-weighted over check-ins from a more distributed set of users to prevent potential collusion from affecting visibility. In one embodiment, if the visibility state of a place is set to be visible to all users, then places service 110 may add the place to the sub-set of nearby places (e.g., Place ID=1). In one embodiment, if the visibility state of a place is set to hidden to all users, then places service 110 does not add the place to the sub-set of nearby places (e.g., Place 4). In one embodiment, if the visibility state of a place is set to "visible to friends" and the one or more users associated with a place overlap with the friends list, then places service 110 adds the place to the sub-set of nearby places. For example, places service 110 adds place ID=3 to the sub-set of nearby places because user ID=100 is associated with place ID=3 and is a friend of user ID=50. For example, places service 110 adds place ID=5 to the sub-set of nearby places because the requesting user ID=50 is the creator of the place. For example, places service 110 does not add place ID=2 to the sub-set of nearby places because there is no overlap between the friends list and the associated users. In particular embodiments, places service 110 may provide the selected sub-set of the one or more nearby places to the user for the user's check-in request (Step 205). In the example of FIG. 2A, places service 110 returns a list of places ID=1, 3, and 5 to the requesting user ID=50. For example, this list of places could be returned to a client application of a mobile device to be displayed to a user in a type-ahead listing of suggested places as the user enters text into a text entry field (as FIG. 1A illustrates).

In particular embodiments, when a user creates a place in a social networking system, the social networking system may set the initial state of the place's visibility state. In particular embodiments, the social networking system may set the initial state of a newly created place to be visible to all friends of the creating user. In particular embodiments, the social networking system may set the initial visibility state based on the level of trustworthiness of the creating user. For example, the social networking system can set the initial visibility state to be visible to all friends of the creating user if the creating user has a high trustworthiness score. Alternatively, the system may set the initial visibility state to be visible only to the creating user if the creating user has a low trustworthiness score. For example, the social networking system can set the initial visibility state to be visible to all users in the social networking system if the creating user had created many places in the past and none of those places had been flagged as inappropriate (e.g., spam, offensive, etc.). Additionally, some networking computing systems monitor the interactions of users with the system and generate scores that generally indicate the trustworthiness of a user. In some implementations, the trustworthiness score may be based at least in part on indications of whether the interactions are attributable to human users or internet bots. An example process of determining the level of trustworthiness of a user based on user actions is described more generally in U.S. patent application Ser. No. 11/701,744 filed on Feb. 2, 2007, which is hereby incorporated by reference in its entirety and for all purposes. In one embodiment, when a user creates a new place, social networking system may access an external or internal search service against the name provided by the user (and the geographic coordinates associated with the check-in) to determine whether such search service returns information in search results suggest that the newly-created place corresponds to an actual location. If so, social networking system may set the initial visibility state to globally visible. In particular embodiments, the social networking system may set the initial visibility of a place to be hidden from all users. For example, if a user wants to create a place for a military installation and the social networking system can set the visibility to be hidden from all users for national security reason. For example, the system may maintain a set of place names and/or geographic locations or regions that are prohibited from being made visible. In particular embodiments, the social networking system may set the initial visibility of a place based on nature of the creating user or the place. For example, the social networking system may set the initial visibility of a place created by a individual user as visible to the user's friends, and set the initial visibility of a place created by a well-known business as visible to all users in the social networking system.

Social networking system may also import place information from trust or semi-trusted sources. In some implementations, social networking system may initially set the visibility states of such places to globally visible. In some implementations, social networking system may maintain this visibility state even if a number of users flag the place. In some implementations, social networking system may allow users to report a place as "closed," which may lower the visibility state or cause the place to be placed on a review queue for review by editorial staff.

In particular embodiments, the social networking system may make a place visible to a user regardless of the visibility state of the place. In particular embodiments, if a first user wants to create a place and the social networking system determines that the place has been created by another user, the social networking system may provide the place to the first user to check in, instead of creating a duplicate instance of the same place. In particular embodiments, if a user searches a first place near the user's current location by providing text (such as a text string that contains a full or partial name) describing the first place (such as a name), the social networking system may make a second place visible to the user if the name of the second place matches completely or partially to the text string.

The social networking system can increase the visibility of the place if the place becomes more popular—for example, more than 10 distinct users in the social networking system check-in to the place. Similarly, the social networking system can decrease the visibility of the place if the social networking system determines that the place is offensive or inappropriate to other users when, for example, more than 10 distinct users in the social networking system "flag" the place as offensive. In addition, a user may also flag a place as being no-longer active, such as a restaurant that has moved or gone out of business.

Figure 3:
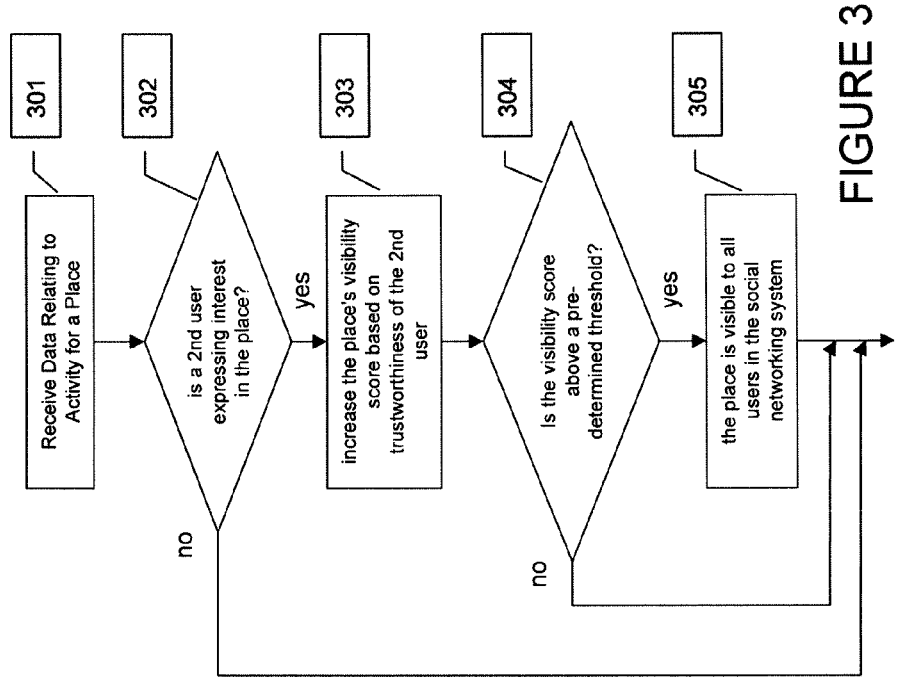
FIG. 3 illustrates an example method of increasing the visibility of a place created by a user.

FIG. 3 illustrates an example method of increasing the visibility of a place created by a user based on activity associated with a place. In this process, increasing the visibility of a place involves increasing a visibility state parameter. In particular embodiments, a place may be set with a visibility state when the place is created in a social networking system (e.g., visible to all friends of the creating user). In particular embodiments, places service 110 receives data relating to activity for the place (Step 301). Some examples of data relating to activity for a place are: a user searches for the place, a user checks in at the place, a user tags the place to an event, a user flags the place as obsolete, or a photo associated with the place is viewed by a user. In particular embodiments, if a distinct second user in the social networking system expresses interest in the place, then places service 110 may increase a visibility score of the place based on the trustworthiness of the second user, otherwise the visibility of the place stays the same (Step 302 and 303). For example, a user expresses interest in a place if the user checks in at the place, or the user tries to create a second instance of the same place. The increase in the visibility score can be adjusted by multiplying the increase in the visibility score by a weighting factor for trustworthiness of the user (Step 303). For example, a friend of the creating user can have a weighting factor of 1.0 ("trustworthy"), a suspected bot or known spammer can have a weighting factor of 0.0 ("untrustworthy"), and a user who created an inappropriate place before may have a weighting factor of 0.2 ("questionable"). In particular embodiments, if the visibility score of the place exceeds a pre-determined threshold, places service 110 may increment the visibility state of the place, such as setting visibility state of the place to be visible to all users in the social networking system, otherwise the visibility state of the place stays the same (Step 305 and 306).

Figure 4:
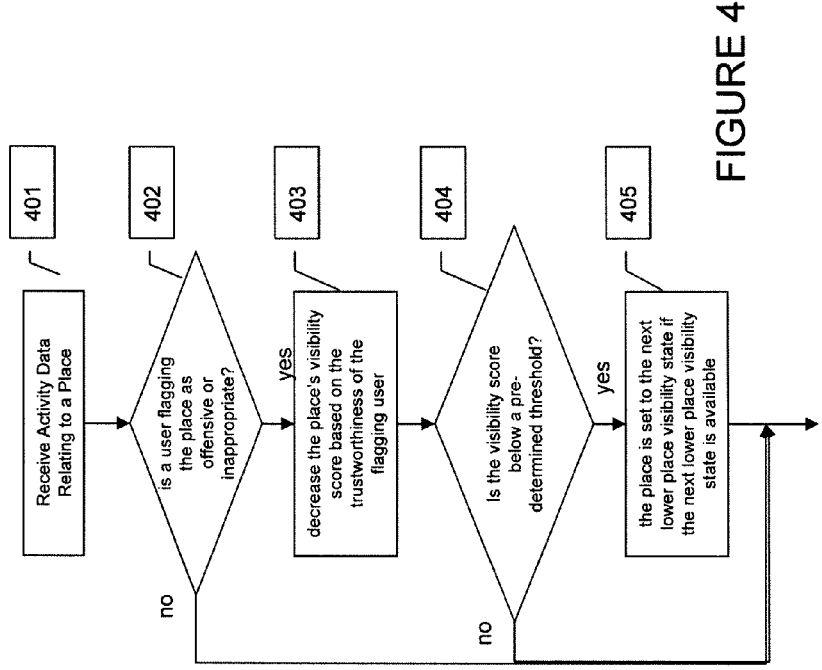
FIG. 4 illustrates an example method of decreasing the visibility of a place.

FIG. 4 illustrates an example method of decreasing the visibility of a place. In particular embodiments, a place may be set with a visibility state when the place is created in a social networking system. In particular embodiments, a first visibility state and the highest visibility state may be that a place is visible to all users in the social networking system. In particular embodiments, the next highest visibility state may be that a place is visible only to a creator of the place, and to all friends of the creating user. In particular embodiments, the next highest visibility state may be that a place is only visible to a creator of the place. In particular embodiments, the lowest visibility state may be that a place is hidden from all users of the social networking system. In particular embodiments, if a distinct user flags a place as obsolete, offensive or inappropriate, then the social networking system may decrease a visibility score of the place; otherwise the visibility score may stay the same (Step 402 and 403). Other signals that may cause visibility state to be reduced include a scenario where a place has appeared in search results a significant number of times without being selected by users, indicating that the place may be irrelevant or inappropriate to at least a subset of users. In particular embodiments, the decrease in the visibility score of the place may be adjusted by trustworthiness of the flagging user. For example, the social networking system may not decrease the visibility score of a place if the place is flagged by a particular user who flags a disproportionately large number of places. In particular embodiments, if the visibility score is below a pre-determined threshold, then the social networking system may set the place to the next lower visibility state, otherwise the visibility state of the place stays the same (Step 404 and 405).

In an alternative embodiment, the social networking system may calculate a composite score including a positive interaction component and a negative interaction component. For example, the social networking system may calculate a user trust score for each distinct user that interacted with a place (checked in or flagged it). The social networking system may also consider or count the number of tagged users that were checked-in by other users either as separate counts and/or, if a user approved the check-in, as an additional weighting factor for counting a particular check-in. This score may range from [0,1]. The social networking system may then add up the user trust scores of all users who checked in to a place and separately add up the user trust scores of all users who flagged the place. The social networking system may calculate the ratio of (sum scores people who flagged the place)/(sum scores people who checked in or flagged the place). The social networking system may then select a visibility state based on the value of the ratio relative to a set of threshold that correspond to the different visibility states. In some implementations, social networking system may require a minimum number of data points (flags and check-ins) before adjusting a visibility state from its initial setting.

In addition, other events and factors may be relevant to determining the visibility state for a place. For example, if a user claims the page corresponding to the page as authentic (such as a business owner claiming administrative rights over the page), the social networking system may set the place to globally visible. Furthermore, the social networking system may apply a hysteresis mechanism to prevent the visibility state for a place from throttling back and forth in a short period of time or after a small number of additional user interactions. For example, the social networking system may apply a mechanism that models arrival rate of check-ins/flags as a Poisson process and calculates probabilities that the ratio could fluctuate by a certain amount. When there are only few data points, a single check-in/flag has a bigger effect on the ratio than if there are many check-ins/flags. The Poisson process approach provides one method for preventing the visibility state from oscillating back and forth. In addition, social networking system may also prevent the visibility state of a place from being downgraded if there are a threshold number of check-ins to a place under the assumption that the shear number of check-ins may indicate that a place is legitimate regardless of the number of flags. Still further, check-ins and/or flags bunched in time may be de-weighted as they are much more likely to be attributable to spam behavior.

Figure 5:
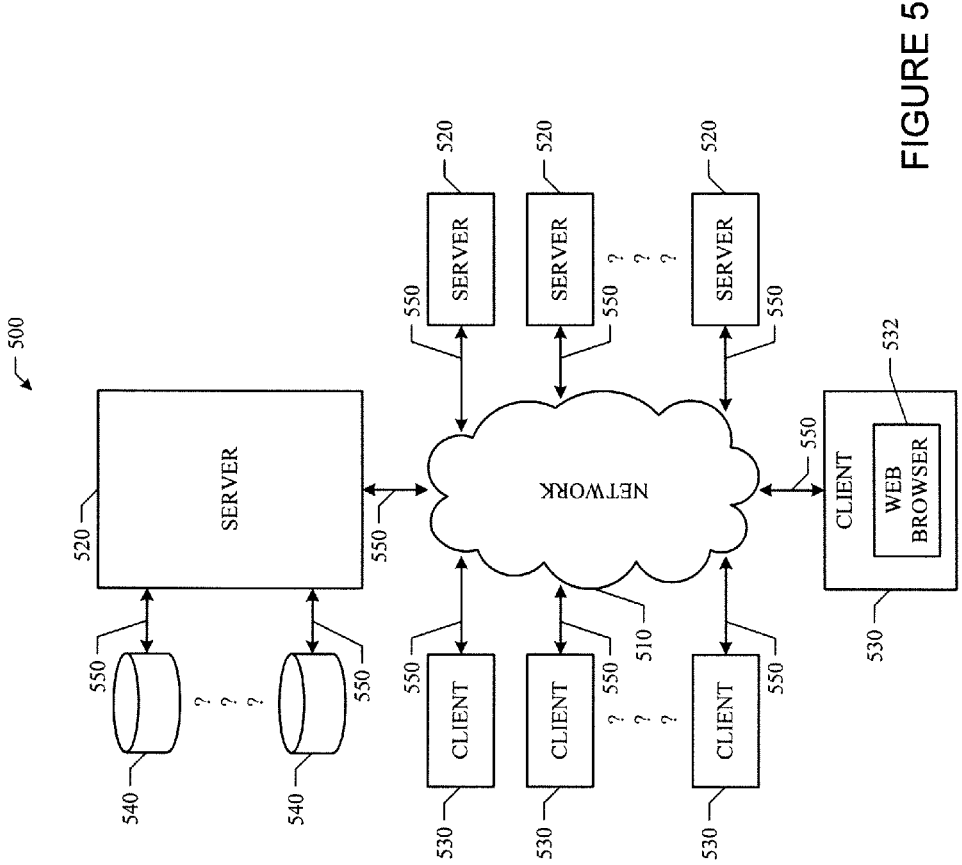
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, places service 110 and social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
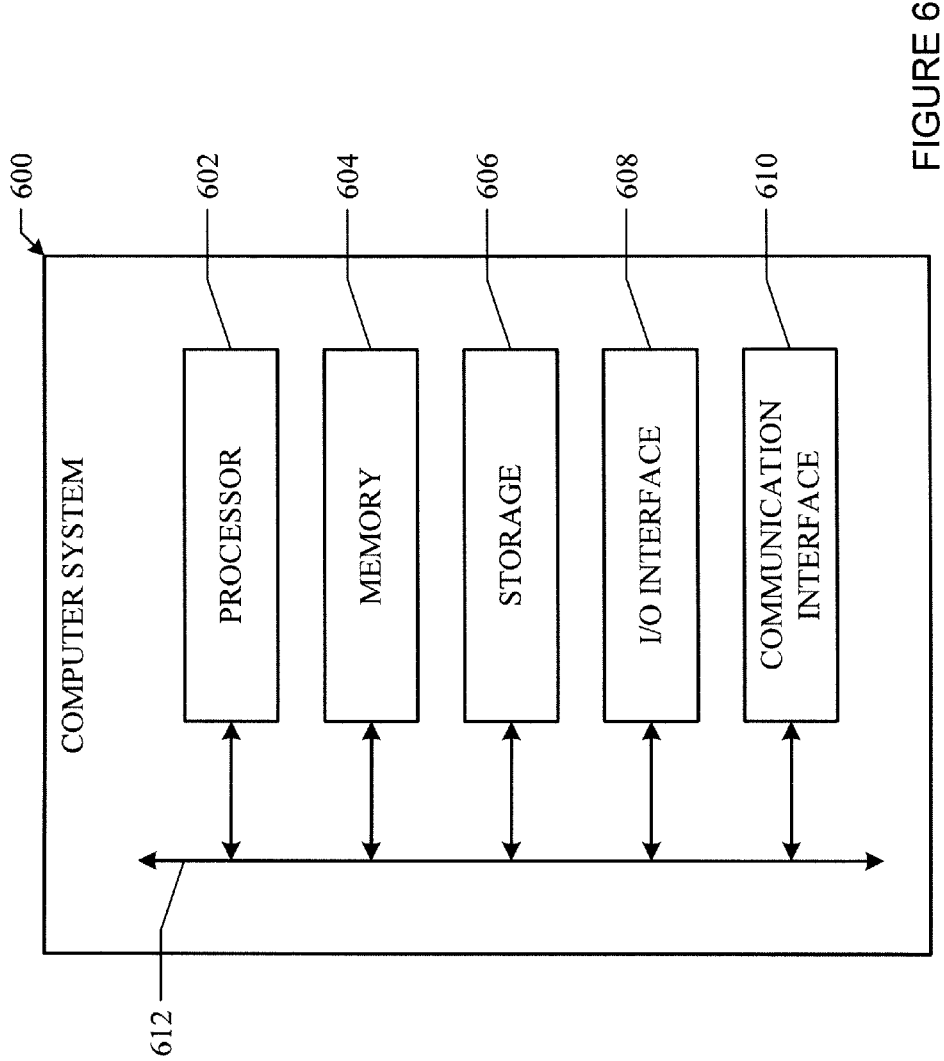
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: maintaining, using one or more processors associated with one or more computer servers associated with a social-networking system, a social graph comprising: a plurality of user nodes, wherein each user node corresponds to a user of the social-networking system; and a plurality of edges, wherein one or more edges connect two user nodes, wherein the two user nodes correspond to two respective users of the social-networking system, and wherein the edges connecting the two user nodes represent a social contact relationship between the two users; maintaining, using the one or more processors, a data store of places in the social-networking system, each place having a corresponding web page and being associated with at least one user of the social-networking system, wherein one or more of the places has a visibility state from a plurality of visibility states operative to control the visibility of the web page corresponding to a place, the visibility state controlling visibility of the web page to users of the social-networking system; analyzing, using the one or more processors, for a first place, user activity data associated with the first place to modulate the visibility state of the first place in the data store, the user activity data being associated with one or more users of the social-networking system, wherein the plurality of visibility states operative to control the visibility of the web page corresponding to a place comprises: a first visibility state wherein the web page is visible to all users in the social-networking system; a second visibility state wherein the web page is visible only to social contacts of one or more users associated with the place; a third visibility state wherein the web page is visible only to a creator of the place; and a fourth visibility state wherein the web page is hidden from all users of the social-networking system; setting an initial visibility state of the first place; updating a visibility score of the first place based on the user activity data associated with the first place; and updating the visibility state of the first place based at least on the visibility score of the first place.

2. The method of claim 1, wherein updating the visibility state of the first place based at least on the visibility score of the first place comprises: if the visibility score is above a threshold value, then: incrementing the visibility state of the first place.

3. The method of claim 1, wherein:
updating the visibility state of the first place based at least on the visibility score of the first place comprises:
if the visibility score is below a threshold value, then: decrementing the visibility state of the first place.

4. The method of claim 1 further comprising:
receiving a request, wherein the request includes a user identifier associated with a user and a geographic location;
accessing a data store of user profile information to identify a set of one or more direct social contacts of the requesting user;
accessing the data store of places to identify a set of one or more nearby places within the one or more nearby places are within a threshold distance from the geographic location;
selecting a sub-set of the set of one or more nearby places based on the visibility state for each place and one or more users associated with each place; and
providing the selected sub-set of the set of one or more nearby places to the requesting user.

5. The method of claim 4 wherein the request further includes a character string and wherein the accessing the data store of places comprises matching the character string to one or more place identifiers each corresponding to one or more places stored in the data store.

6. The method of claim 5 wherein the matching the character string to place identifiers corresponding to places stored in the data store comprises determining a partial match between the character string and each place identifier.

7. The method of claim 1 wherein the user activity data associated with the first place comprises tagging other users in connection with a check-in to the first place.

8. An apparatus comprising: a memory; one or more processors; a program comprising computer-readable instructions operative, when executed, to cause the one or more processors to: maintain a social graph comprising: a plurality of user nodes, wherein each user node corresponds to a user of the social-networking system; and a plurality of edges, wherein one or more edges connect two user nodes, wherein the two user nodes correspond to two respective users of the social-networking system, and wherein the edges connecting the two user nodes represent a social contact relationship between the two users; access a data store of places in the social-networking system, each place having a corresponding web page and being associated with at least one user of the social-networking system, wherein one or more of the places has a visibility state from a plurality of visibility states operative to control the visibility of the web page corresponding a place, the visibility state controlling visibility of the web page to users of the social-networking system; and analyze, for a first place, user activity data associated with the first place to modulate the visibility state of the first place in the data store, the user activity data being associated with one or more users of the social-networking system, wherein the plurality of visibility states operative to control the visibility of the web page corresponding to a place comprises: a first visibility state wherein the web page is visible to all users in the social-networking system; a second visibility state wherein the web page is visible only to social contacts of one or more users associated with the place; a third visibility state wherein the web page is visible only to a creator of the place; and a fourth visibility state wherein the web page is hidden from all users of the social-networking system, system; wherein the program further comprises instructions operative to cause the one or more processors to: set an initial visibility state of the first place; update a visibility score of the first place based on the user activity data associated with the first place; and update the visibility state of the first place based at least on the visibility score of the first place.

9. The apparatus of claim 8, wherein the program further comprises instructions operative to cause the one or more processors to: if the visibility score is above a threshold value, then: increment the visibility state of the first place.

10. The apparatus of claim 8, wherein the program further comprises instructions operative to cause the one or more processors to:
if the visibility score is below a threshold value, then: decrement the visibility state of the first place.

11. The apparatus of claim 8 wherein the program further comprises instructions operative to cause the one or more processors to:
receive a request, wherein the request includes a user identifier associated with a user and a geographic location;
access a data store of user profile information to identify a set of one or more direct social contacts of the requesting user;
access the data store of places to identify a set of one or more nearby places within the one or more nearby places are within a threshold distance from the geographic location;
select a sub-set of the set of one or more nearby places based on the visibility state for each place and one or more users associated with each place; and
provide the selected sub-set of the set of one or more nearby places to the requesting user.

12. The apparatus of claim 11 wherein the request further includes a character string and wherein, to access the data store of places, the program further comprises instructions operative to cause the one or more processors to match the character string to one or more place identifiers each corresponding to one or more places stored in the data store.

13. The apparatus of claim 12 wherein, to match the character string to place identifiers corresponding to places stored in the data store, the program comprises instructions operative to cause the one or more processors to determine a partial match between the character string and each place identifier.

14. The apparatus of claim 8 wherein the user activity data associated with the first place comprises tagging other users in connection with a check-in to the first place.

\* \* \* \* \*